(12) United States Patent
Inoue et al.

(10) Patent No.: US 6,259,961 B1
(45) Date of Patent: Jul. 10, 2001

(54) CONTINUOUS PROCESSING CONVEYING SYSTEM AND CONTROL METHOD FOR THE SAME

(75) Inventors: Katsuhiro Inoue; Kouji Satoh, both of Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/166,086

(22) Filed: Oct. 5, 1998

(30) Foreign Application Priority Data

Oct. 3, 1997 (JP) .................................................. 9-270692

(51) Int. Cl.[7] .................................................. G06F 19/00
(52) U.S. Cl. ........................... 700/112; 700/117; 700/230
(58) Field of Search .................................. 700/112, 121, 700/113, 117, 230

(56) References Cited

U.S. PATENT DOCUMENTS

| | | | |
|---|---|---|---|
| 5,189,624 | * 2/1993 | Barlow et al. ....................... | 700/169 |
| 5,828,572 | * 10/1998 | Hasegawa et al. .................... | 700/117 |
| 5,842,917 | * 12/1998 | Soung et al. ......................... | 454/187 |
| 5,867,388 | * 2/1999 | Okumura et al. .................... | 700/112 |
| 5,975,741 | * 11/1999 | Kawaguchi et al. ................. | 700/121 |
| 5,976,199 | * 11/1999 | Wu et al. .............................. | 29/25.01 |
| 5,980,591 | * 11/1999 | Akimoto et al. .................... | 29/25.01 |

* cited by examiner

*Primary Examiner*—William Grant
*Assistant Examiner*—Zoila Cabrera
(74) *Attorney, Agent, or Firm*—Venable; Robert J. Frank; Allen Wood

(57) ABSTRACT

When a treatment process and an inspection process are continuous, in order to transfer a lot therebetween more simply and more reliably, in a conveying system comprising a depository storing lots each of which is one group of the same species, there is provided a plurality of treatment apparatuses for treating the lots; an inspection apparatus for inspecting the lots after treatment; an automated guided vehicle for conveying the lot by moving between the depository and the treatment apparatus; and a control computer which controls treatment processing of the lot, wherein a delivery device is disposed at an area adjacent to the inspection apparatus for conveying the lot in and out the automated guided vehicle so that a plurality of lots can be placed thereon simultaneously.

8 Claims, 10 Drawing Sheets

PROCESS INFORMATION TABLE

| PROCESS ID |
| --- |
| APPARATUS CAPABLE TREATING ID1 |
| APPARATUS CAPABLE TREATING ID2 |
| ⋮ |
| APPARATUS CAPABLE TREATING IDn |
| TREATMENT CONDITIONS |

FIG. 8

APPARATUS INFORMATION TABLE

| APPARATUS ID |
| --- |
| AVAILABILITY FLAG |
| BAY NO. |
| DEPOSITORY ID |
| BUFFER NO. 1 AVAILABLE TO CARRY |
| BUFFER NO. 2 AVAILABLE TO CARRY |
| ⋮ |
| BUFFER NO. n AVAILABLE TO CARRY |

FIG. 9

CONTINUOUS PROCESSING CONVEYING SYSTEM AND CONTROL METHOD FOR THE SAME

BACKGROUND OF THE INVENTION

1. Field of the Invention

The present invention relates to a conveying system for continuous processing such as a pre-treatment of a semiconductor and to a control method of the system.

2. Description of the Related Art

FIG. 11 illustrates an example of a conventional pre-treatment conveying system for a semiconductor. As shown in the figure, the conveying system comprises a control computer 10 which controls the system as a whole, a terminal 11 disposed at each treatment area in a factory which is connected to the control computer 10, a depository 1 for storing a lot to be treated (including inspection), a plurality of treatment apparatuses 7 and 9, an in-process automated guided vehicle 5 moving between the treatment apparatuses, and inspection apparatuses 8.

The control computer 10 comprises a process information table having information for each process as shown in FIG. 8, and an apparatus information table having information for controlling conditions of each treatment apparatus as shown in FIG. 9. The process information table has information for each process, which apparatuses can process and processing conditions. The process information table also has information for each apparatus including an availability flag which shows whether the apparatus is available or not, a bay number which shows the location thereof, and a buffer number showing which locations can admit a lot.

The performance of the conventional conveying system will be described.

A lot comprising a plurality of untreated wafers is carried by the in-process automated guided vehicle 5 from the depository 1 to any of the treatment apparatuses 7 and 9 for treatment, under the control of instructions from the control computer 10. The flow of the lot after treatment will be described with reference to a flow chart in FIG. 10. When a treatment process of a lot is finished (S1), the control computer 10 retrieves apparatuses that can perform the next process (S2) and judges whether a free buffer is available in the apparatuses by referring to the apparatus information table (S4, S5) to decide the destination apparatus of the next process (S6). Then the control computer 10 instructs the in-process automated guided vehicle 5 to carry the lot to the instructed treatment apparatus (S8). On the other hand, since the inspection apparatus 8 is not included in the table information as an apparatus that can process, when the next process is inspection, the destination of the lot is set to be the depository 1 (S7).

An inspection operator selects the next lot to inspect from a plurality of lots waiting for inspection in the depository 1 by consulting the terminal 11, and takes the lot out of the depository 1. Then the lot is inspected at the inspection apparatus 8 and returned it to the depository 1 if it is acceptable. If it is not acceptable, it is carried to a storage for remedy or scrapping.

However, since in the conventional conveying system, as described above, all the completed lots waiting for inspection are carried into the depository 1, the following problems occur.

(1) An inspection operator has to perform bothersome operations such as retrieving lots in the depository by consulting the terminal 11, searching for the lots waiting for inspection among the lots retrieved, and selecting the next lot to be inspected. In order to eliminate these operations, when the lot waiting for inspection is put into the depository through an in-process gateway of the depository, it may be taken out automatically through an operator-gateway of the depository. However since the operator-gateway is constructed so that each lot is taken one-by-one, a lot which must be quickly inspected can not be taken out instantly. Consequently the problem is not solved effectively.

(2) Since the operator-gateway of the depository is used by not only inspection operators but also treatment apparatus operators, a lot can be mistaken.

SUMMARY OF THE INVENTION

Accordingly, it is an object of the present invention to solve the aforementioned problems.

According to one aspect of the present invention there is provided a conveying system which comprises a depository storing lots each of which is one group of the same species; a plurality of treatment apparatuses for treating the lots; an inspection apparatus for inspecting the lots after treatment; an automated guided vehicle for conveying the lots by moving between the depository and the treatment apparatus; and a control computer which controls treatment processing of the lots, wherein a delivery device is disposed at an area adjacent to the inspection apparatus for conveying the lots in and out the automated guided vehicle, and the lot is carried in the delivery device from the automated guided vehicle at the time of inspection.

The delivery device also comprises a function to display information about the lot carried therein.

The delivery device further comprises means for inputting information identifying the lot.

According to another aspect of the invention, there is provided a control method for a continuous processing in which the conveying system comprises a depository for storing lots each of which is one group of the same species; a plurality of treatment apparatuses for treating the lot; an inspection apparatus for inspecting the lot after treatment; an automated guided vehicle for conveying the lots by moving between the depository and the treatment apparatus; a control computer which controls treatment processing of the lots; and a delivery device disposed at an area adjacent to the inspection apparatus for conveying the lot in and out the automated guided vehicle, wherein the control method performs based on a process information table having information about each process and an apparatus information table for controlling conditions of each of the treatment apparatuses. Further, the apparatus information table includes information about the delivery device and the destination of the lots is decided by the control computer according to the information about the delivery device.

In the aforementioned control method, the destination of the lot is also set to be the delivery device which is stored in the apparatus information table as an apparatus that can perform treatment as the next process of the lots.

In the aforementioned control method, the destination of the lots is also set to be the delivery device which is stored in the apparatus information table of the treatment apparatus where the lot is located at that time.

BRIEF DESCRIPTION OF THE DRAWINGS

FIG. 8 is an example illustration of a process information table stored in the control computer;

FIG. 9 is an example illustration of an apparatus information table stored in the control computer;

DESCRIPTION OF THE PREFERRED EMBODIMENT

First Embodiment

Figure 1:
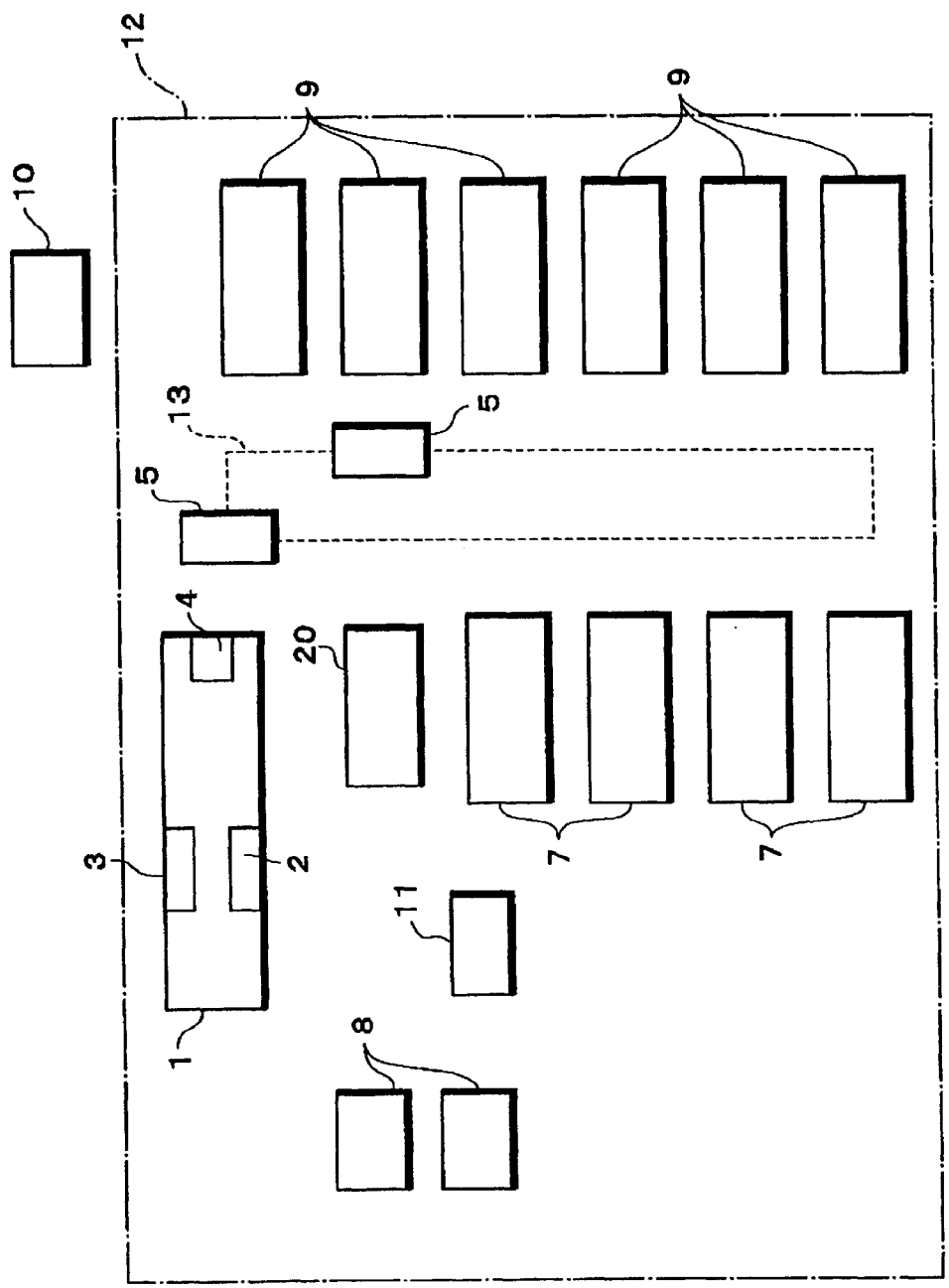
FIG. 1 is a block diagram of a conveying system for semiconductor pre-treatments according to an embodiment of the present invention.
Figure 2:
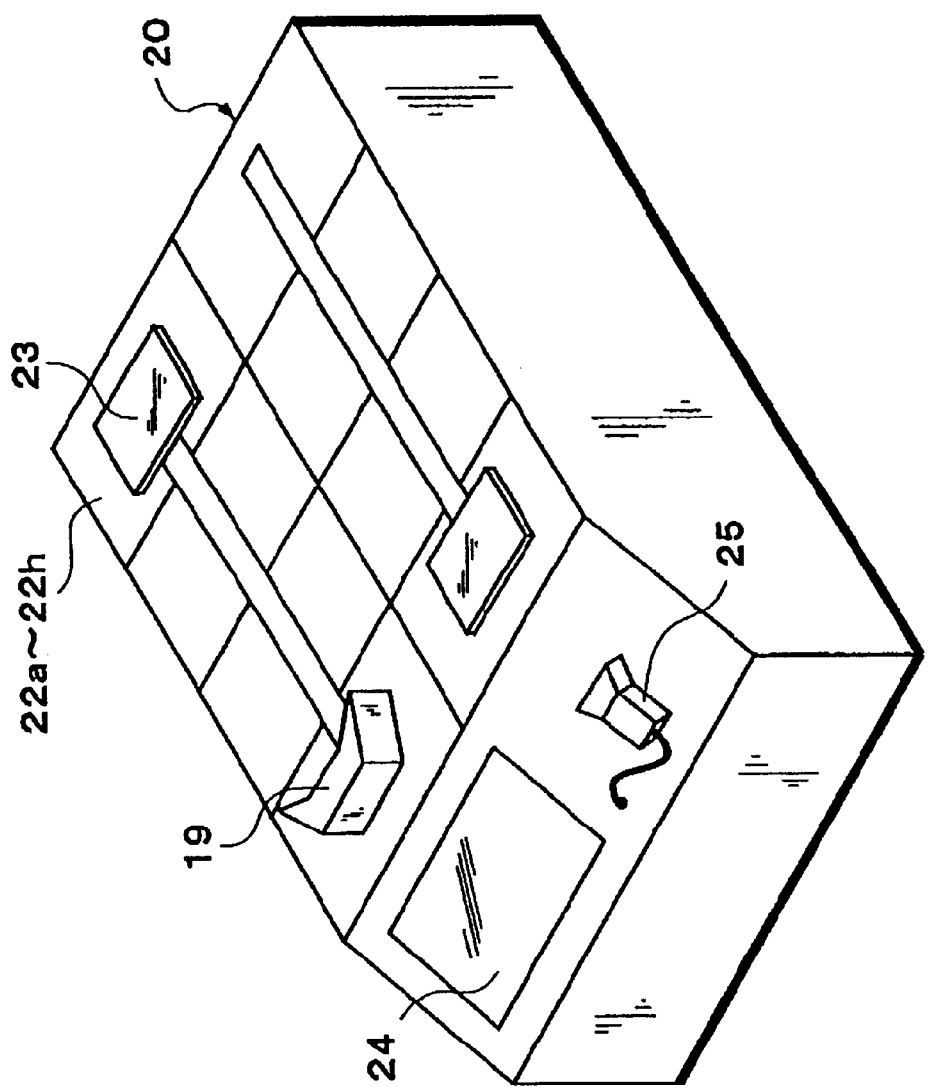
FIG. 2 is a perspective view of a delivery device according to the invention.

FIG. 1 is a block diagram showing each apparatus of a conveying system according to the present invention and FIG. 2 is a perspective view of a delivery device according to the invention. As shown in FIG. 1, the conveying system according to the invention comprises a delivery device 20, disposed in proximity to an inspection apparatus 8, which is capable of delivering lots between the inspection apparatus 8 and an in-process automated guided vehicle 5. Each apparatus and device is connected to a control computer 10 through communication cables or radio to exchange data.

The control computer 10 comprises a process information table and an apparatus information table as in the conventional example, however, the apparatus information table also includes ID information other than the information shown in FIG. 9 identifying the delivery device 20.

Figure 3:
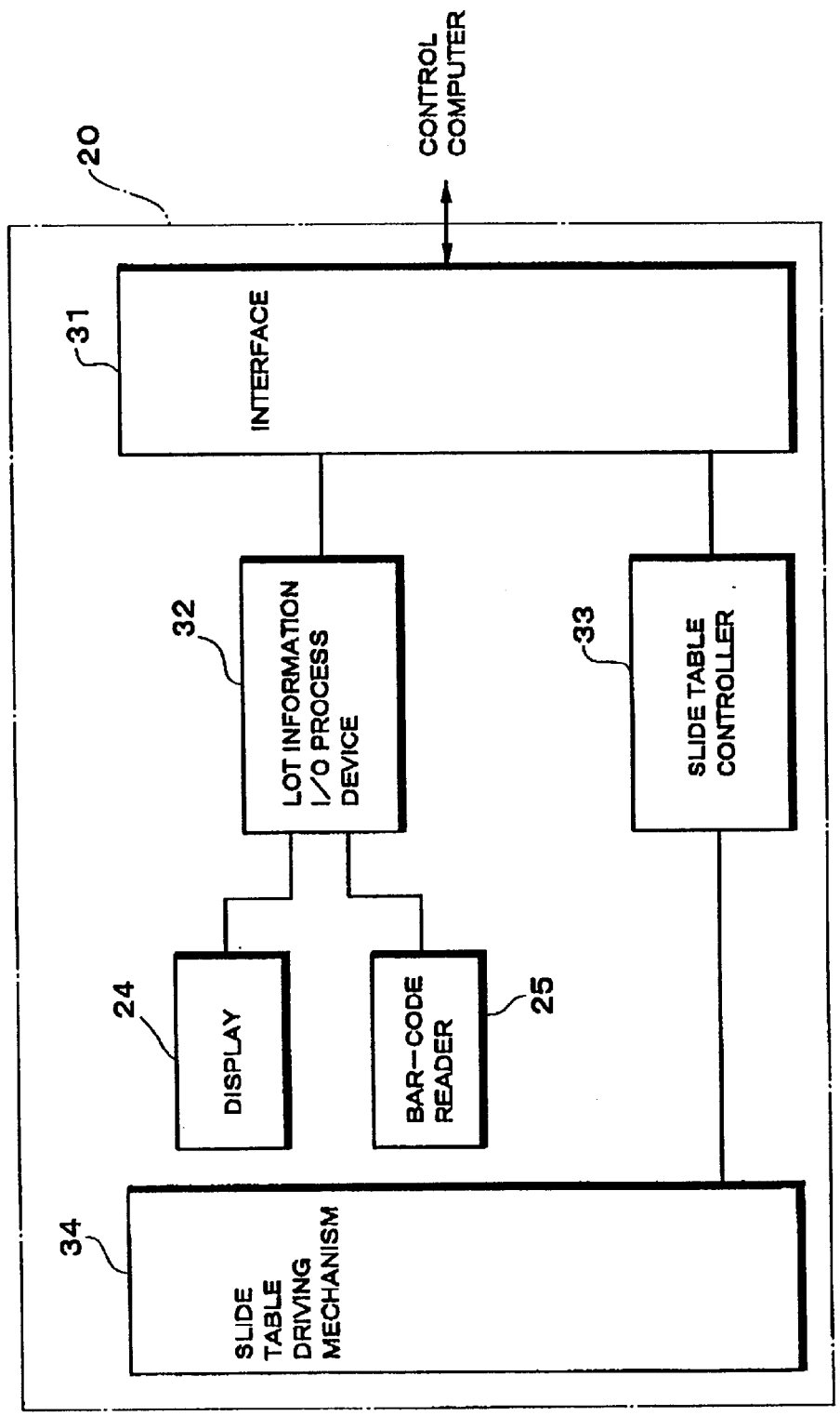
FIG. 3 is a block diagram of the delivery device according to the invention.

The delivery device 20, as shown in FIG. 2, comprises buffers 22a to 22h, which are locations in which can simultaneously be placed a plurality of cassettes 19 including each lot, a slide table 23 for transferring the cassette 19 by an operator toward each of the buffers 22a to 22h from the in-process automated guided vehicle 5 side, a display 24 which displays lot information of the cassette 19, and a bar-code reader 25 which reads an ID bar-code disposed on the cassette 19, identifying the lot. The delivery device 20, as shown in a block diagram of FIG. 3, further comprises an interface 31 which exchanges data with the control computer 10, a lot information I/O processing device 32 which processes to display the lot information on the display 24 according to the data from the control computer 10 and sends the ID information captured from the bar-code reader 25 to the control computer 10, a slide table controller 33 to operate the slide table 23 according to the data from the control computer 10, and a slide table driving mechanism 34.

Figure 4:
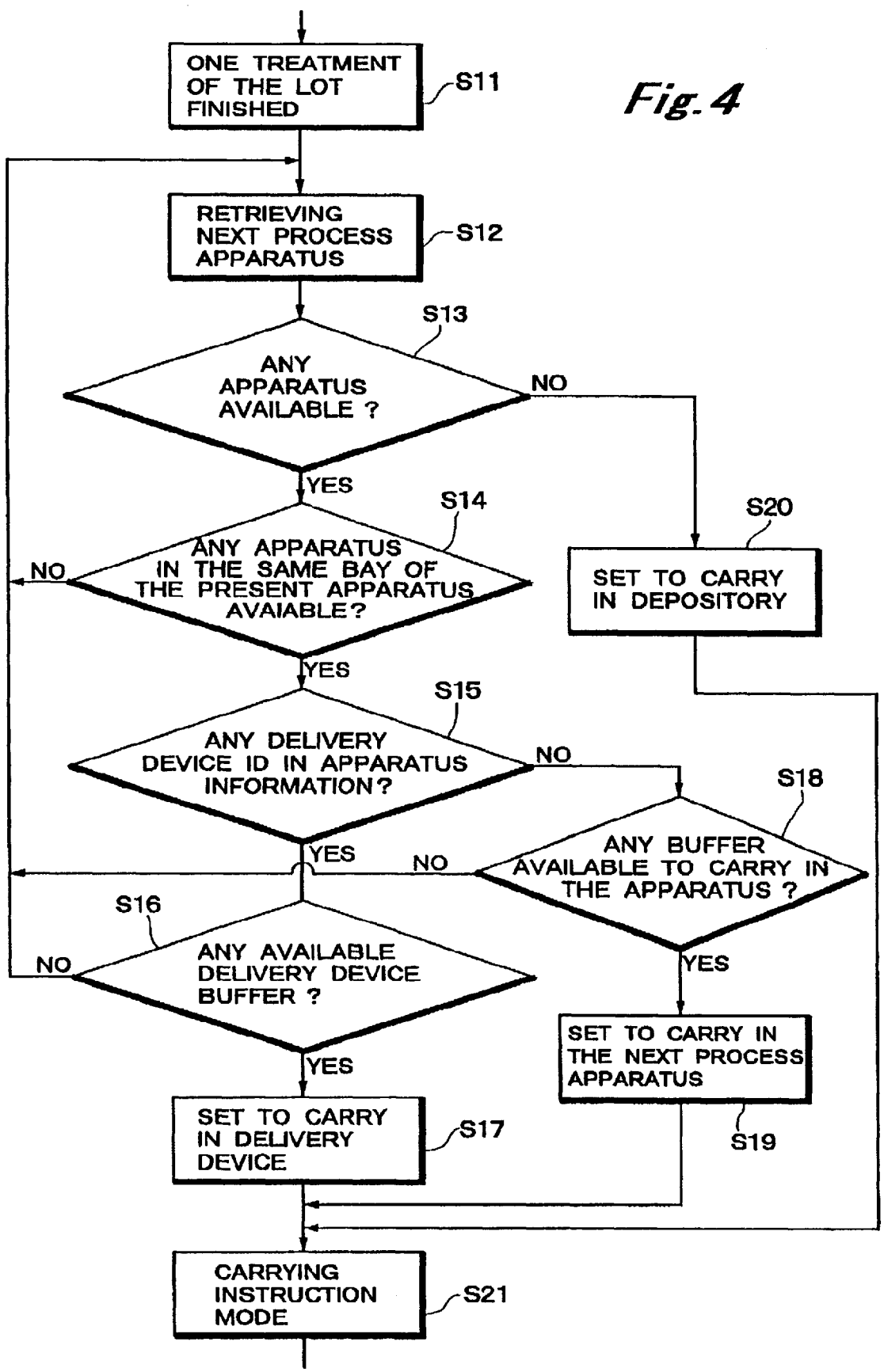
FIG. 4 is a flow chart illustrating one controlling method for a conveying system according to the invention.
Figure 5:
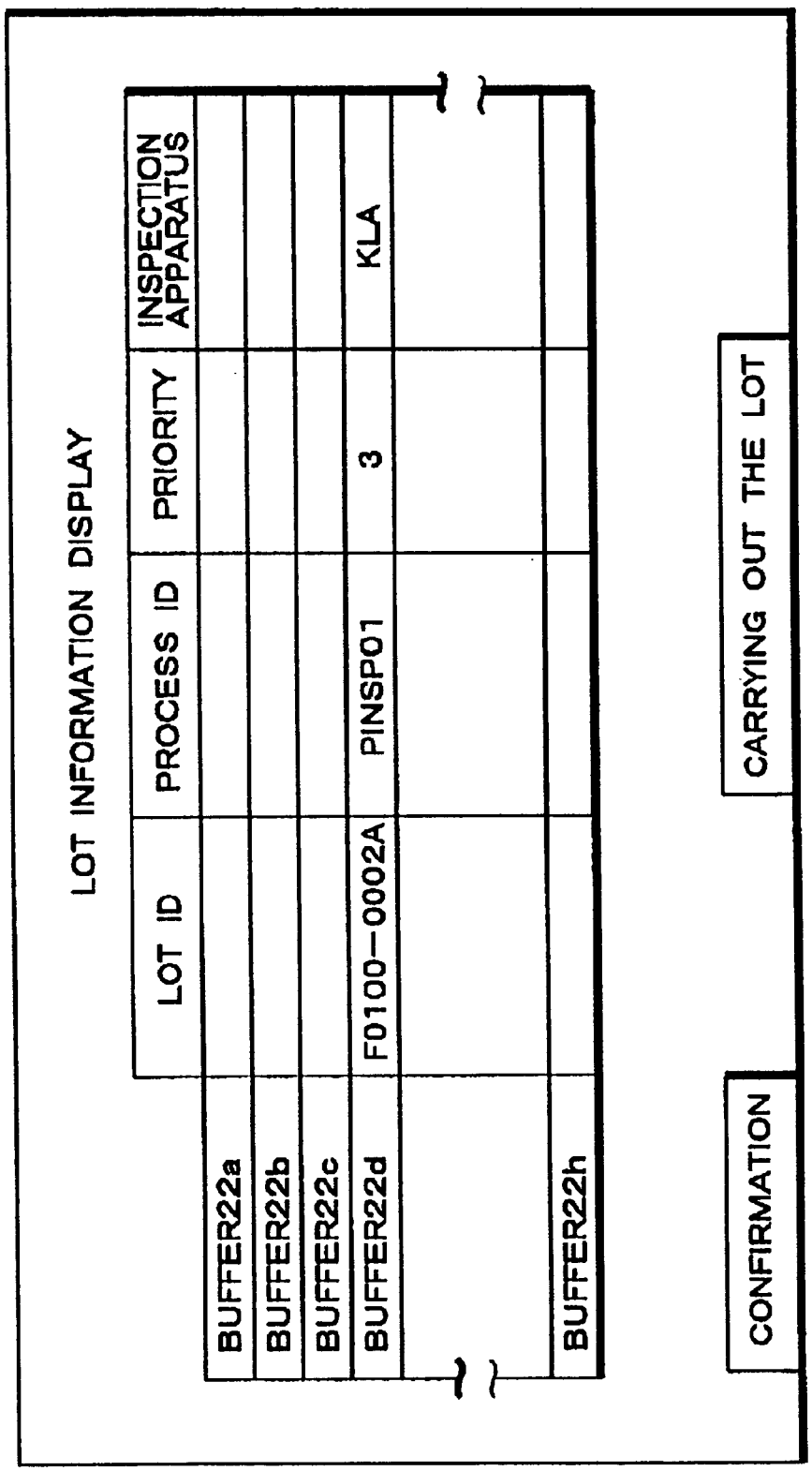
FIG. 5 is an example illustration of a lot information picture in a display of the delivery device.

Operations of the conveying system will be described according to a control flow chart shown in FIG. 4.

A lot comprising a plurality of wafers in a depository 1 is carried to any one of treatment apparatuses 7 or 9 from the depository 1 by means of the in-process automated guided vehicle 5 according to a decision and instructions from the control computer 10.

When the completion of one process is detected (S11), the control computer 10 retrieves apparatuses being available for treating from a process information table (cf. FIG. 8) of the next process (S12, S13). If it is determined in step (S13) by the control computer 10 that there is no available apparatus that can treat, the lot is carried to the depository 1 (S20). In contrast, if there is available an apparatus that can treat, the control computer 10 compares the bay numbers of the apparatus from the apparatus information table, and the apparatus where the lot is presently located (S14). If the bay numbers differ, the process returns to step (S12). If the bay numbers are the same, the control computer 10 determines if the apparatus information table contains the ID number of the delivery device 20 (S15). If the delivery device 20 is listed, the control computer 10 decides from the apparatus information table of the delivery device 20 whether any of buffers 22a to 22h can accept the lot (S16). If a free buffer is available, the control computer 10 decides that the delivery device 20 is the destination (S17) and instructs the in-process automated guided vehicle 5 to carry the lot (S21). Accordingly, the in-process automated guided vehicle 5 transfers the lot to the delivery device 20. If the delivery device ID is unavailable at step (S 15), the control computer 10 determines whether any of the apparatus available for treatment has a carrying buffer (S18). If a carrying buffer is available, the control computer 10 sets the next treating apparatus as the destination (S19) and instructs the in-process automated guided vehicle 5 to carry the lot (S21).

A plurality of cassettes 19 containing each lot can be placed on the delivery device 20. When the in-process automated guided vehicle 5 places the cassette 19 on the slide table 23 of the delivery device 20, the slide table 23 moves to any one of buffers 22a to 22h to place the cassette 19 thereon by means of the slide table controller 33 for driving the slide table driving mechanism 34. On the other hand, the lot information I/O processing device 32 of the delivery device 20 receives lot information from the control computer 10 to display lot information such as lot IDs, process IDs, and operation priorities on the display 24. An operator selects a higher priority lot or earlier arrived lot when the priorities are the same by recognizing the lot information, and takes the lot out of the corresponding cassette 19 to perform the inspection. The result of the inspection is confirmed and input in the terminal 11. If the lot passes the inspection, it is carried to the depository 1, otherwise it is carried to a different storage.

Therefore, it is not necessary for the operator to search for and select the lot in the depository 1 for inspecting by the terminal 11. Therefore operability can be improved. Since only the lots waiting for inspection are carried in the delivery device 20, there is an advantage of reducing mistakes of the inspecting operator in mistaking another lot for the lot waiting for inspection.

Second Embodiment

When the depository 1 is not available, for example, due to some problem, the delivery device 20 can be used instead of the depository 1.

Figure 6:
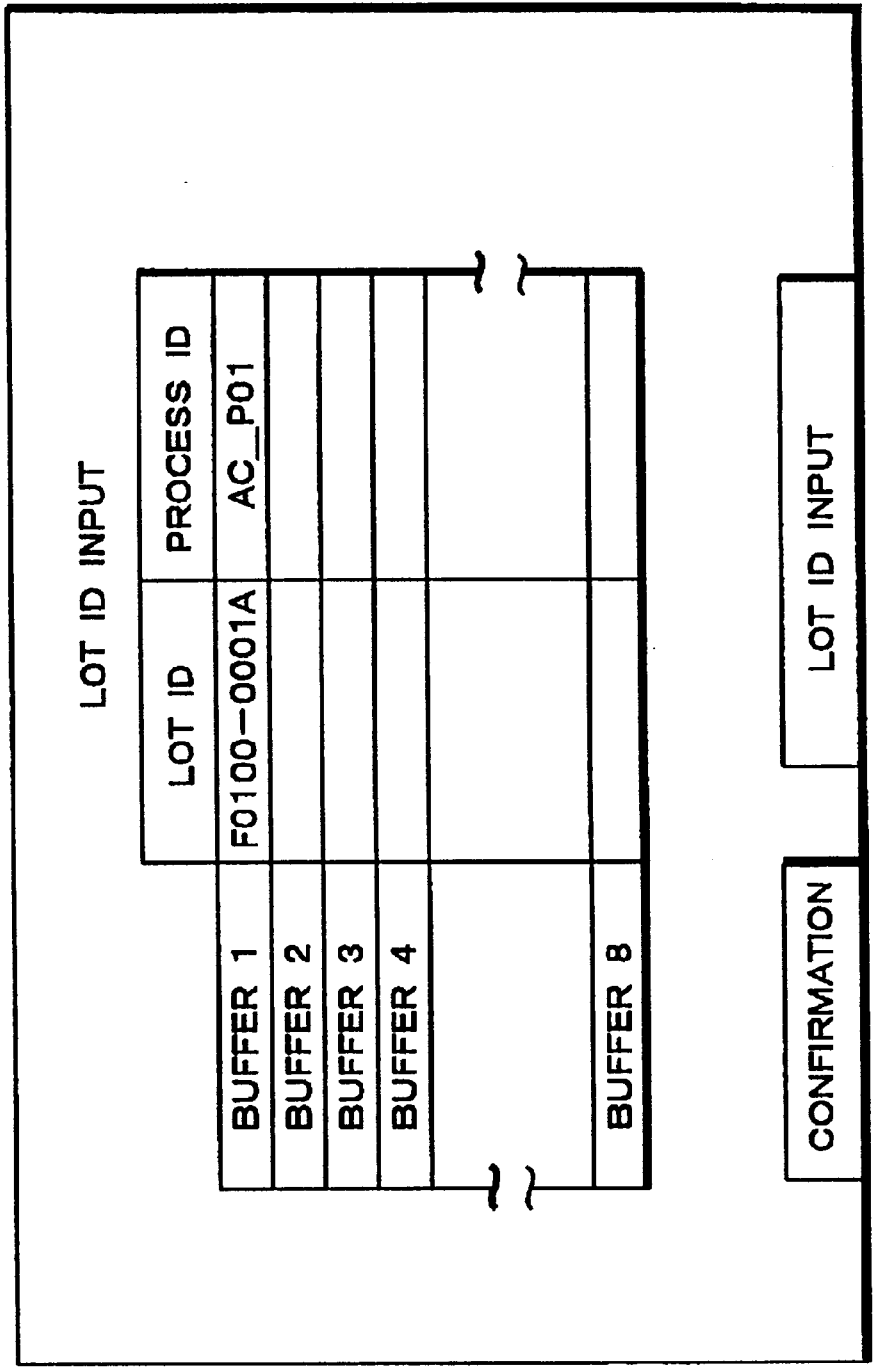
FIG. 6 an example illustration of a lot ID input picture in a display of the delivery device.

That is, a cassette of a lot carried from the previous process is placed on any of the buffers 22a to 22h of the delivery device 20, which are not in the depository 1. There, the lot ID of the cassette is input in the delivery device 20 using the bar-code reader 25. The delivery device 20 receives lot information such as the corresponding process ID from the control computer 10 by sending the lot ID to the control computer 10 to display it in the display 24 as shown, for example, in FIG. 6. By a depression of an authentication key by the operator, the delivery device 20 transfers the cassette on the buffer adjacent to the side of the in-process automated guided vehicle 5 by the slide table 23 and simultaneously notifies the control computer 10 of the ID of the lot to be carried away. The control computer 10 sets the destination of the lot for the next processing and instructs the in-process automated guided vehicle 5 to carry it, and the in-process automated guided vehicle 5 in turn carries it to the instructed apparatus.

As for the lots which have finished all the treatments, the control computer 10 which recognizes a problem in the depository 1 decides to send them to the delivery device 20 in which they are inspected as described above.

As described above, even when the depository 1 is stopped by some problem, the conveying system utilizing the in-process automated guided vehicle 5 can continue to operate by setting the lots from previous processes in the delivery device 20. This may increase the availability factor of the conveying system.

Further, the lot information can be confirmed at the delivery device 20 so that mistaking one lot for another can be prevented.

Third Embodiment

Figure 7:
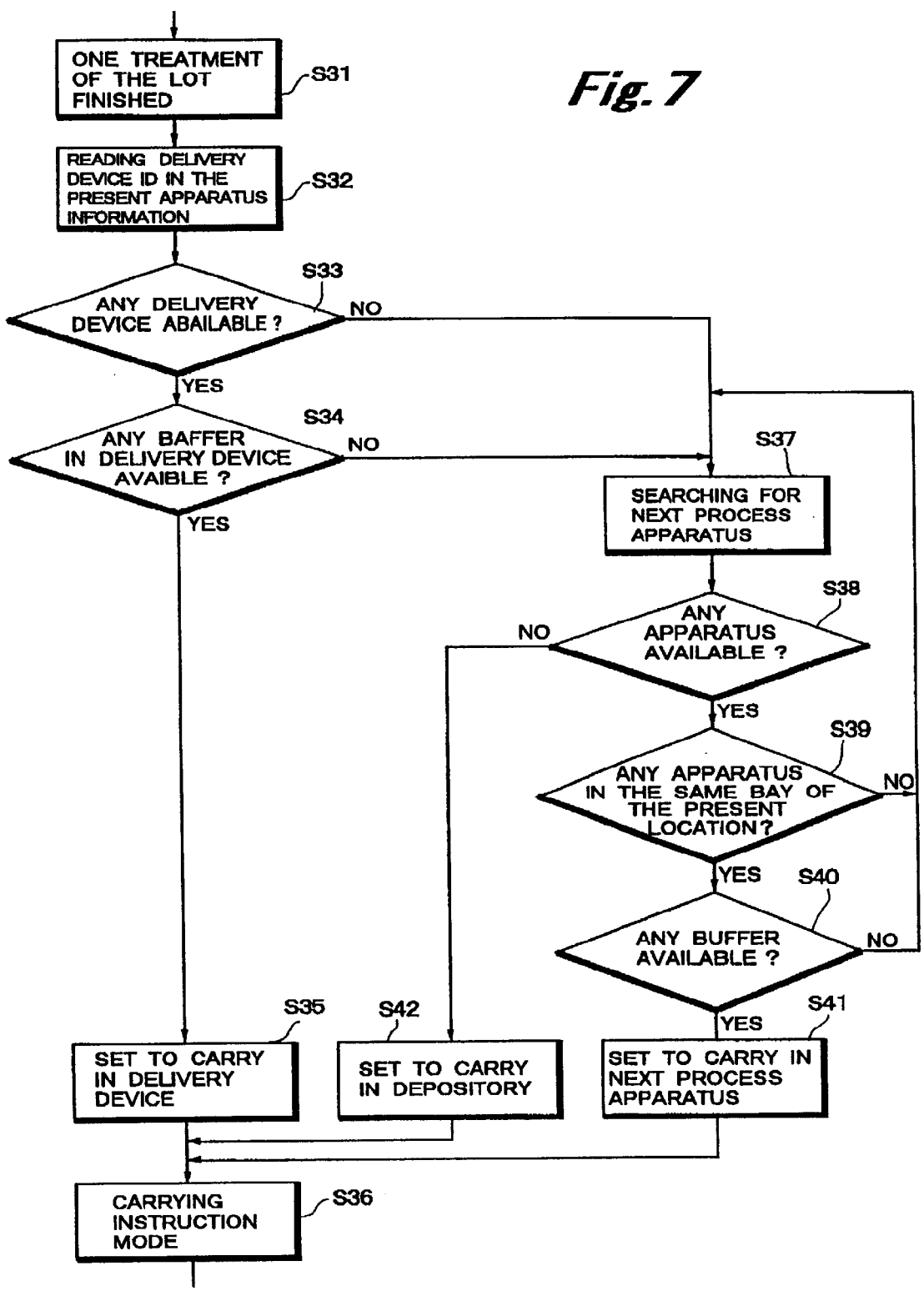
FIG. 7 is a flow chart illustrating another controlling method for a conveying system according to the invention.
Figure 10:
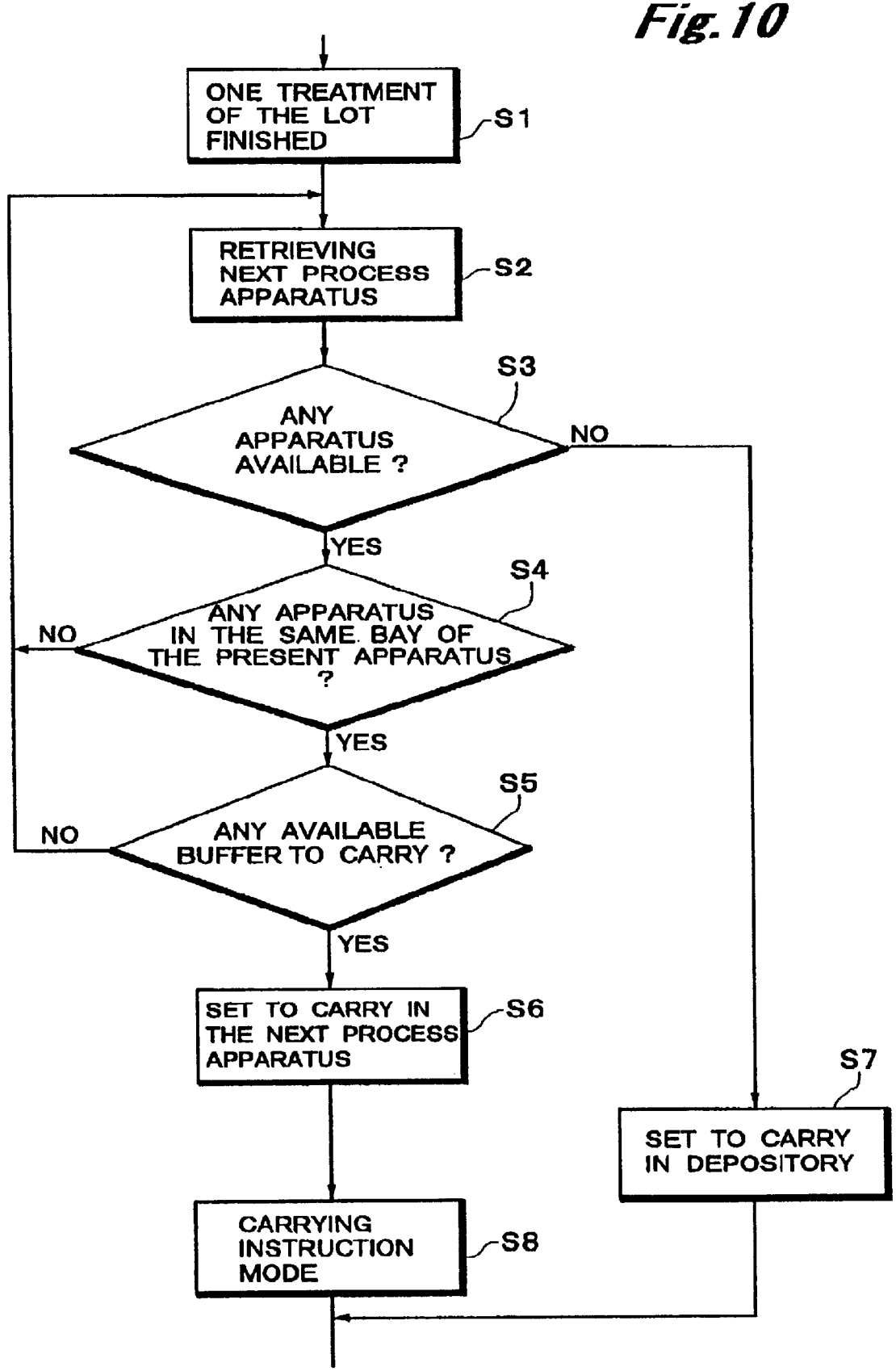
FIG. 10 is a flow chart illustrating a conventional controlling method for a conveying system.
Figure 11:
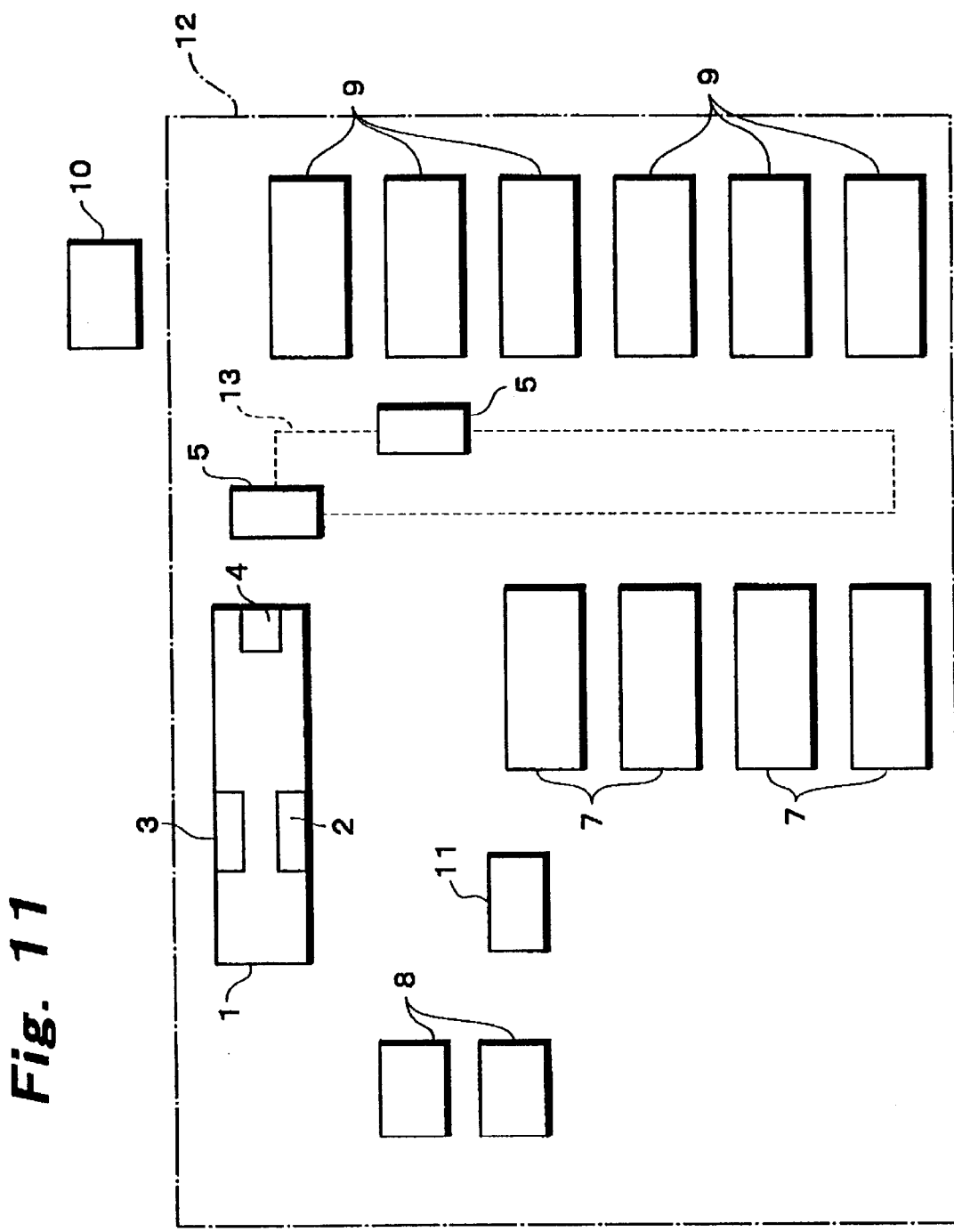
FIG. 11 is a block diagram of a conventional conveying system for semiconductor pre-treatment.

Another control method of the conveying system will be described according to an operations flow chart in FIG. 7. Operations are the same as the First Embodiment in which a lot comprising a plurality of wafers prior to treatment is transferred to any of the treatment apparatuses 7 to 9 from the depository 1 by the in-process automated guided vehicle 5 to finish one treatment (S31) by virtue of a decision and instructions of the control computer 10.

The control computer 10 refers to the apparatus information table of the apparatus where the lot is located and reads the delivery device 20 ID (S32) to decide whether the delivery device 20 is available or not (S33). If the delivery device 20 is not available, the lot will proceed along the control flow of the conveying system as described with reference to FIG. 7 (S37 to S42). In contrast, if the delivery device 20 is available, the control computer 10 decides from the apparatus information table of the delivery device whether there is any buffer which can carry the lot (S34). If a buffer is not available, the lot will proceed along the control flow of the conveying system as described with reference to FIG. 7 (S34). If a buffer is available, the computer sets the buffer of the delivery device 20 as the destination (S35) and instructs the in-process automated guided vehicle 5 to carry the lot (S36). Then the lot is carried in the delivery device 20. The subsequent operations of the delivery device 20 are the same as described above.

Although the aforementioned embodiments are described as the conveying system in a semiconductor-manufacturing factory for example, a system according to the present invention can be used in any manufacturing line for a continuous processing other than semiconductor manufacturing.

According to the invention, it is not necessary for the operator to search for and select the lot for inspecting in the depository using the terminal. Therefore inspection workability can be improved. Since only the lots waiting for inspection are carried in the delivery device, there is an advantage of reducing errors of the operator in mistaking another lot for the lot waiting for inspection.

Even when the depository is stopped due to some problem, the conveying system utilizing the in-process automated guided vehicle can continue to operate by setting the lots from previous processes in the delivery device. This may increase the availability factor of the conveying system.

Further, the lot information can be confirmed at the delivery device so that mistaking one lot for another can be prevented.

What is claimed is:

1. A continuous processing conveying system comprising:
   a depository storing lots each of which is one group of the same species;
   a plurality of treatment apparatuses to treat said lots;
   an inspection apparatus to inspect said lots;
   an automated guided vehicle to convey said lots between said depository and said treatment apparatuses;
   a delivery device disposed in proximity to said inspection apparatus to transfer said lots from said automated guided vehicle, said delivery device having a plurality of buffers to accommodate lots; and
   a control computer which controls treatment processing of said lots and instructs said automatic guided vehicle of a destination of said lots, said control computer additionally deciding whether any of said buffers of said delivery device can accommodate a lot,
   wherein, if said control computer decides that the next process of said lots is inspection, said control computer instructs said automated guided vehicle ot carry said lots to said delivery device.

2. A continuous processing conveying system comprising:
   a depository storing lots each of which is one group of the same species;
   a plurality of treatment apparatuses to treat said lots;
   an inspection apparatus to inspect said lots;
   an automated guided vehicle to convey said lots between said depository and said treatment apparatuses;
   a control computer which controls treatment processing of said lots and instructs said automated guided vehicle of a destination of said lots; and
   a delivery device disposed in proximity to said inspection apparatus to transfer said lots from said automated guided vehicle;
   wherein, if said control computer decides that the next process of said lots is inspection, said control computer instructs said automated guided vehicle to carry said lots to said delivery device, and
   wherein said delivery device comprises a function to capture information from said control computer about lots that are being transferred by said delivery device, and to display said information.

3. A continuous processing conveying system, comprising:
   a depository storing lots each of which is one group of the same species;
   a plurality of treatment apparatuses to treat said lots;
   an inspection apparatus to inspect said lots;
   an automated guided vehicle to convey said lots between said depository and said treatment apparatuses;
   a control computer which controls treatment processing of said lots and instructs said automated guided vehicle of a destination of said lots; and
   a delivery device disposed in proximity to said inspection apparatus to transfer said lots from said automated guided vehicle;
   wherein, if said control computer decides that the next process of said lots is inspection, said control computer instructs said automated guided vehicle to carry said lots to said delivery device, and wherein said delivery device comprises a reader for inputting information for identifying said lots.

4. A control method for a continuous processing conveying system having a depository storing lots each of which is one group of the same species, a plurality of treatment apparatuses to treat said lots, an inspection apparatus to inspect said lots after treatment, an automated guided vehicle to convey said lots by moving between said depository and said treatment apparatuses, a control computer which controls treatment processing of said lots, and a delivery device disposed in an area adjacent to said inspection apparatus to convey said lots in and out of said automated guided vehicle, said control method comprising the steps of:

preparing a process information table to indicate the available treatment apparatuses for each treatment;

preparing an apparatus information table to control conditions of said treatment apparatuses; and instructing said control computer of a destination of said lots based on information in said process information table and said apparatus information table, wherein said apparatus information table includes information about said delivery device and the destination of said lots is decided by said control computer according to the information about said delivery device.

5. A control method according to claim 4, wherein the destination of said lots is set to be said delivery device which is stored in said apparatus information table as an apparatus that can perform treatment as the next process of said lots.

6. A control method according to claim 4, wherein the destination of said lots is set to be said delivery device which is stored in said apparatus information table of the treatment apparatus where said lot is located at that time.

7. A continuous processing conveying system according to claim 1, wherein said delivery device comprises a function to capture information of lots accommodated by said buffers from said control computer and to display said information.

8. A continuous processing conveying system according to claim 1, wherein said delivery device comprises a reader for inputting information for identifying said lots.

\* \* \* \* \*